US011991678B2

(12) United States Patent
Umehara

(10) Patent No.: US 11,991,678 B2
(45) Date of Patent: May 21, 2024

(54) WIRELESS COMMUNICATION APPARATUS, METHOD OF CONTROLLING THE APPARATUS, AND NON-TRANSITORY COMPUTER-READABLE STORAGE MEDIUM

(71) Applicant: CANON KABUSHIKI KAISHA, Tokyo (JP)

(72) Inventor: Makoto Umehara, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/729,657

(22) Filed: Apr. 26, 2022

(65) Prior Publication Data

US 2022/0256540 A1 Aug. 11, 2022

Related U.S. Application Data

(63) Continuation of application No. 16/908,013, filed on Jun. 22, 2020, now Pat. No. 11,337,216.

(30) Foreign Application Priority Data

Jun. 27, 2019 (JP) ................................ 2019-119944

(51) Int. Cl.
*H04W 12/30* (2021.01)
*H04W 4/50* (2018.01)
(Continued)

(52) U.S. Cl.
CPC ......... *H04W 72/0453* (2013.01); *H04W 4/50* (2018.02); *H04W 4/80* (2018.02); *H04W 84/12* (2013.01)

(58) Field of Classification Search
CPC ... H04W 72/0453; H04W 4/50; H04W 84/12; H04W 4/80; H04W 12/35; H04W 12/047;
(Continued)

(56) References Cited

U.S. PATENT DOCUMENTS 10,849,169 B2 † 11/2020 Tachibana
11,337,216 B2 * 5/2022 Umehara ............... H04W 12/06
(Continued)

FOREIGN PATENT DOCUMENTS

CN 1882128 A 12/2006
CN 106982457 A 7/2017
(Continued)

*Primary Examiner* — Joseph E Dean, Jr.
(74) *Attorney, Agent, or Firm* — Canon U.S.A., Inc. IP Division

(57) ABSTRACT

There is provided a wireless communication apparatus that is able to perform a first wireless communication and a second wireless communication, the second wireless communication having power consumption lower than that of the first wireless communication. The wireless communication apparatus receives, from another wireless communication apparatus through the second wireless communication, information indicating a channel which the another wireless communication apparatus is able to use in the first wireless communication, selects a communication parameter to be provided to the another wireless communication apparatus based on the received information, the communication parameter being required by the another wireless communication apparatus to connect to an apparatus that forms a network in which the first wireless communication occurs; and transmits the selected communication parameter to the another wireless communication apparatus through the first wireless communication.

13 Claims, 7 Drawing Sheets

(51) Int. Cl.
  *H04W 8/00*      (2009.01)
  *H04W 72/0453*   (2023.01)
  *H04W 4/80*      (2018.01)
  *H04W 84/12*     (2009.01)

(58) Field of Classification Search
  CPC ..... H04W 12/69; H04W 12/06; H04W 8/005;
          H04W 88/06; H04W 84/18; H04W 8/24;
          H04W 12/04; H04W 52/0209; H04W
                              48/20; H04W 12/50
  See application file for complete search history.

(56) References Cited

U.S. PATENT DOCUMENTS

| | | | |
|---|---|---|---|
| 2014/0098694 | A1 | 4/2014 | Damji |
| 2015/0092764 | A1* | 4/2015 | Hirose ................. H04W 36/14 370/338 |
| 2017/0257819 | A1* | 9/2017 | McCann ............... H04W 12/04 |
| 2018/0167283 | A1* | 6/2018 | Moritomo ......... H04W 12/0431 |
| 2018/0242303 | A1 | 8/2018 | Tachiwa |
| 2019/0116493 | A1* | 4/2019 | Cyril .................... H04W 12/06 |

FOREIGN PATENT DOCUMENTS

| | | | |
|---|---|---|---|
| CN | 107006066 | A | 8/2017 |
| CN | 107211358 | A | 9/2017 |
| JP | 2019083487 | A | 5/2019 |
| JP | 2019537871 | A | 12/2019 |
| WO | 2018075135 | A | 4/2018 |

\* cited by examiner
† cited by third party

WIRELESS COMMUNICATION APPARATUS, METHOD OF CONTROLLING THE APPARATUS, AND NON-TRANSITORY COMPUTER-READABLE STORAGE MEDIUM

CROSS-REFERENCE TO RELATED APPLICATIONS

The present application is a continuation of U.S. patent application Ser. No. 16/908,013, filed on Jun. 22, 2020, which claims priority from Japanese Patent Application No. 2019-119944 filed Jun. 27, 2019, which are hereby incorporated by reference herein in their entireties.

BACKGROUND

Field

The present disclosure relates to a wireless communication apparatus, a method of controlling the wireless communication apparatus, and a non-transitory computer-readable storage medium.

Description of the Related Art

Technologies to perform wireless LAN communication using access points (hereinafter referred to as "APs") have hitherto been known. In order to perform secure wireless LAN communication between a wireless communication apparatus and the APs, it can be necessary to set various communication parameters including an encryption method, an encryption key, an authentication method, and an authentication key.

Device Provisioning Protocol (DPP) was developed in Wi-Fi Alliance as a method of transmitting such communication parameters through a wireless LAN. In the DPP, a configurator that provides the communication parameters, provides, to an enrollee that receives the communication parameters, information called a connector, which is necessary to connect to the APs. In the DPP, a bootstrap process to acquire public key information using a QR code®, Bluetooth® Low Energy (BLE), or the like is defined. In addition, a DPP Authentication process, which is an authentication process for device authentication, and a DPP Configuration process, which is a setting process to transmit the communication parameters, are also defined in the DPP.

Japanese Patent Laid-Open No. 2015-23441 discloses a communication parameter setting method in which a user, via a mobile terminal, selects an AP, which is a connection destination, to set the communication parameters of a communication apparatus. In this communication parameter setting method, the communication apparatus scans surrounding APs and transmits information about the APs detected through the scanning to the mobile terminal. The mobile terminal displays a list of APs in a user interface (UI) of the mobile terminal using the information received from the communication apparatus. Upon selection of an AP by the user, the communication parameters to communicate with the selected AP are transmitted from the mobile terminal to the communication apparatus.

Transmission of the communication parameters from the mobile terminal, which operates as the configurator, to the communication apparatus, which operates as the enrollee, by applying the DPP using the BLE to the communication parameter setting method described in Japanese Patent Laid-Open No. 2015-23441 is considered.

Upon activation of a communication parameter setting application in response to an operation by the user with the UIs of the configurator and the enrollee, the configurator and the enrollee start the bootstrap process. In addition, the enrollee starts scanning using the wireless LAN to detect surrounding APs. In the bootstrap process, the enrollee transmits bootstrap information required in a DPP authentication process of, for example, the public key and a media access control (MAC) address. The bootstrap information is transmitted using the BLE in an advertising packet. The configurator receives the advertising packet to acquire the bootstrap information. Then, the configurator transmits a DPP Authentication Request (authentication request) to the enrollee through the wireless LAN based on the acquired bootstrap information, to establish wireless LAN connection with the enrollee. Then, the configurator receives the AP list from the enrollee through the wireless LAN and transmits the communication parameters of the AP selected by the user to the enrollee.

Since the enrollee performs the scanning through the wireless LAN after activating the communication parameter setting application in the above communication parameter setting process, high power consumption is caused in the enrollee. In addition, it is required for the enrollee to be in a state (a reception idle state) in which the enrollee is capable of receiving the DPP authentication request until the DPP authentication request is transmitted from the configurator. Higher power is consumed in the reception idle state, compared with a sleep state in which a transmission-reception function is deactivated. In particular, when the enrollee is a battery-powered apparatus, such as a camera, the power consumption may become a problem.

Although the power consumption in the enrollee is capable of being reduced if the configurator performs the scanning, the user-friendliness of the system is reduced when the wireless LAN channel supported by the configurator is different from that of the enrollee. For example, there can be a case in which the configurator supports 2.4 GHz and 5 GHz while the enrollee supports only 2.4 GHz. In this case, the configurator may display an AP list including the APs operating at 5 GHz even though the connection using the wireless LAN with the enrollee would be disabled at 5 GHz. Accordingly, the user may erroneously select APs operating at 5 GHz even though the connection using the wireless LAN with the enrollee would be disabled at 5 GHz.

SUMMARY

Various embodiments of the present disclosure seek to address the above-mentioned problems which exist in the conventional technology.

A feature of the present disclosure is to provide a wireless communication apparatus capable of reducing the power consumption in the own apparatus in provision of authentication information about the own apparatus to another wireless communication apparatus to acquire communication parameters.

According to various embodiments of the present disclosure, there is provided a wireless communication apparatus that is able to perform a first wireless communication and a second wireless communication, the second wireless communication having power consumption lower than that of the first wireless communication, the wireless communication apparatus comprising: a receiving unit that receives, from another wireless communication apparatus through the second wireless communication, information indicating a channel which the another wireless communication apparatus is able to use in the first wireless communication; a selecting unit that selects a communication parameter to be provided to the another wireless communication apparatus based on the information received by the receiving unit, the communication parameter being required by the another wireless communication apparatus to connect to an apparatus that forms a network in which the first wireless communication occurs; and a transmitting unit that transmits the communication parameter selected by the selecting unit to the another wireless communication apparatus through the first wireless communication.

Further features will become apparent from the following description of exemplary embodiments with reference to the attached drawings.

BRIEF DESCRIPTION OF THE DRAWINGS

The accompanying drawings, which are incorporated in and constitute a part of the original disclosure, illustrate embodiments of the disclosure and, together with the description, serve to explain the principles of the disclosure.

DESCRIPTION OF THE EMBODIMENTS

Figure 1:
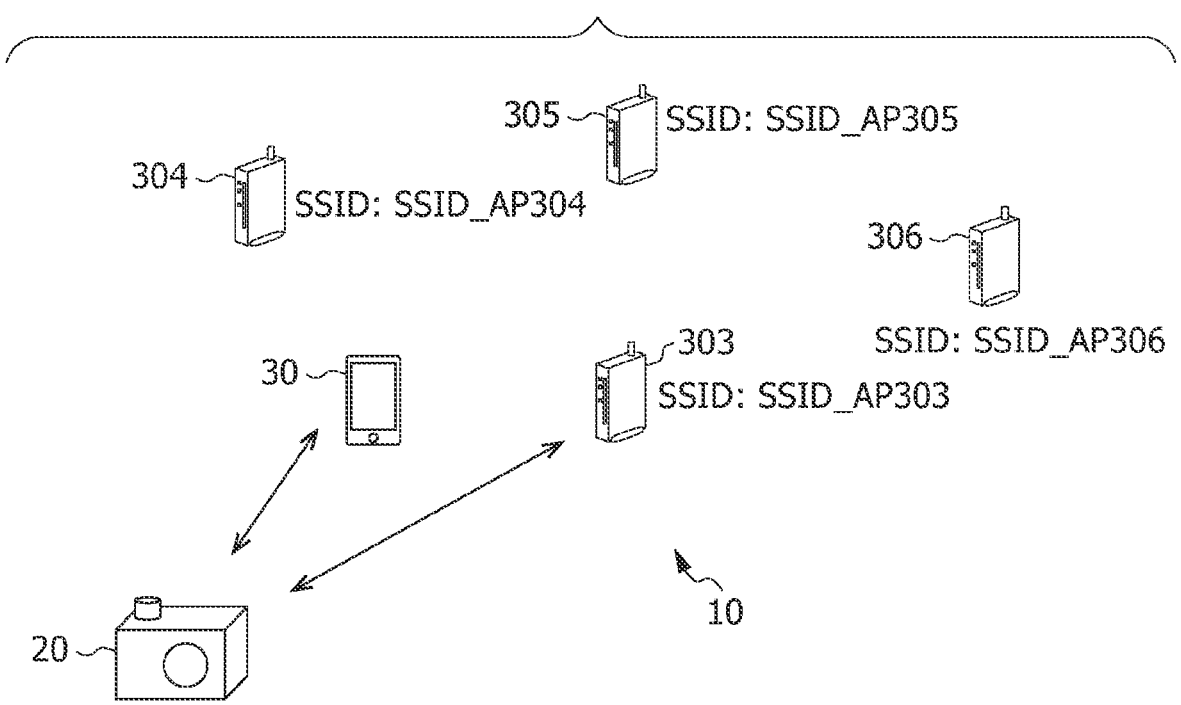
FIG. 1 illustrates an example of the configuration of a communication system according to an embodiment of the present disclosure.

Hereinafter, embodiments will be described in detail with reference to the attached drawings. Note that the following embodiments are not intended to limit the scope of the claimed invention. Multiple features are described in the embodiments, but limitation is not made such that an embodiment requires all such features; multiple such features may be combined as appropriate. Furthermore, in the attached drawings, the same reference numerals are given to the same or similar configurations, and redundant description thereof is omitted.

In the embodiments, an example will be described in which a communication system conforming to the Institute of Electrical and Electronics Engineers, Inc. (IEEE) 802.11 series and the BLE is used. Near field communication is enabled with lower power consumption in the BLE. However, note that various embodiments of the present disclosure are applicable to a wireless communication method other than the wireless LAN conforming to the IEEE 802.11 series and/or the BLE.

<Communication System>

FIG. 1 illustrates an example of the configuration of a communication system 10 according to an embodiment.

The communication system 10 includes a camera 20, a smartphone 30, and APs 303, 304, 305, and 306. A process is described below in which the camera 20 participates in a network formed by the APs 303 to 306. It is assumed that the camera 20 is a battery-powered apparatus.

The smartphone 30 operates in the configurator defined in the DPP and provides information for connection to the APs 303 to 306 to the camera 20. The camera 20 operates as the enrollee defined in the DPP. Service set identifiers (SSIDs) of the APs 303 to 306 are represented by SSID_APs 303 to 306 in the present embodiment.

Although the apparatuses composing the communication system 10 are described as the camera 20, the smartphone 30, and the APs 303 to 306 in the present embodiment, the apparatuses composing the communication system 10 may include, for example, a mobile phone, a printer, a personal computer (PC), a video camera, a smartwatch, a personal digital assistant (PDA), and a projector. Although the number of APs is described as four in the present embodiment, an arbitrary number of APs may be used (the number of APs may be smaller than or equal to three or may be greater than or equal to five). In the communication system 10, each of the camera 20, the smartphone 30, and the APs 303 to 306 is an example of a communication apparatus and the communication apparatus may be a printer, a wearable device, an Internet of Things (IoT) device, or the like.

<Hardware Configuration of Communication Apparatus>

The hardware configuration of the communication apparatuses (the camera 20, the smartphone 30, and the APs 303 to 306) in the communication system 10 will now be described with reference to FIG. 2.

Figure 2:
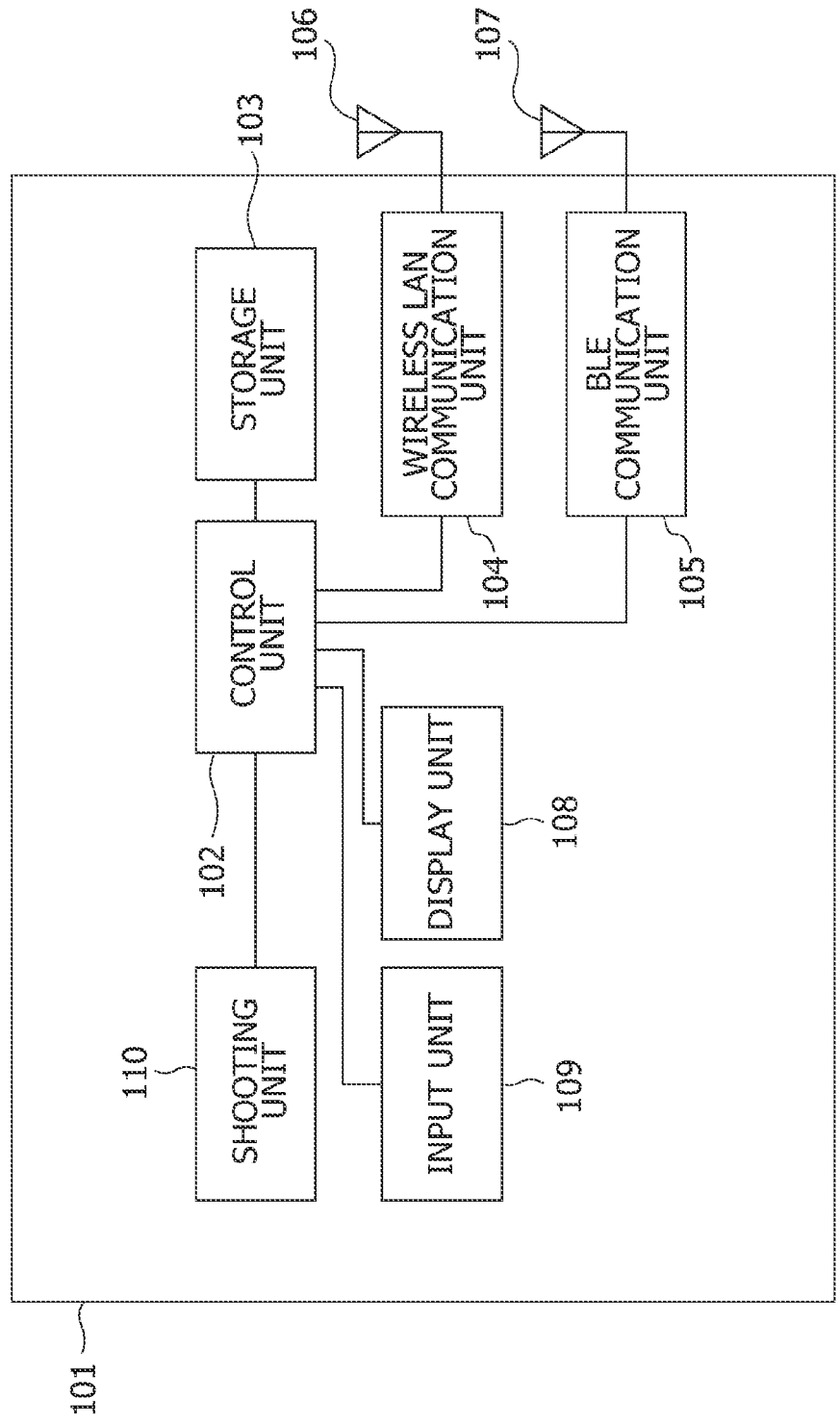
FIG. 2 is a block diagram illustrating an example of the hardware configuration of a communication apparatus according to an embodiment of the present disclosure.

As illustrated in FIG. 2, a communication apparatus 101 includes a control unit 102, a storage unit 103, a wireless LAN communication unit 104, a BLE communication unit 105, a wireless LAN communication antenna 106, a BLE communication antenna 107, a display unit 108, an input unit 109, and a shooting unit 110. The communication apparatus 101 is a wireless communication apparatus.

The control unit 102 executes control programs stored in the storage unit 103 to control the entire communication apparatus 101. The control unit 102 is composed of, for example, one or more processors (for example, central processing units (CPUs) or micro processing units (MPUs)). The control unit 102 in the camera 20 or the smartphone 30 executes the control programs stored in the storage unit 103 to perform flowcharts in FIG. 4 and FIG. 5.

The storage unit 103 stores a variety of information, such as the control programs, image data, and communication parameters. Various operations described below are performed by the control unit 102, which executes the control programs stored in the storage unit 103. The storage unit 103 is composed of one or more memories. The memory is a storage medium, such as a read only memory (ROM), a random access memory (RAM), a hard disk drive (HDD), a flash memory, or a removable secure digital (SD) card.

The wireless LAN communication unit 104 performs wireless communication conforming to the IEEE 802.11 series. The wireless LAN communication unit 104 has the antenna 106 for wireless LAN communication.

The BLE communication unit 105 performs the wireless communication conforming to the BLE. The BLE communication unit 105 has the antenna 107 for BLE communication. The power consumption in the BLE communication unit 105 is lower than that in the wireless LAN communication unit 104. In other words, the BLE communication unit 105 is capable of operating with the power consumption lower than that in the wireless LAN communication unit 104.

Although the communication apparatus 101 includes the wireless LAN communication unit 104 and the BLE communication unit 105 in the present embodiment, the communication apparatus 101 may have a configuration in which the communication apparatus 101 further includes a radio-frequency (RF) switch and one antenna is commonly used as the two antennas: the wireless LAN communication antenna 106 and the BLE communication antenna 107.

The display unit 108 displays and outputs a variety of information (characters, images, sounds, and so on). The display unit 108 includes, for example, a liquid crystal display (LCD) or a light emitting diode (LED) and displays the information in a visual mode. The display unit 108 includes, for example, a speaker and outputs the information in an audible mode. The display unit 108 has a function to output at least one of visual information and audio information. When the display unit 108 outputs (displays) the visual information, the display unit 108 includes a video RAM (VRAM) that holds the image data corresponding to the visual information to be displayed. The display unit 108 performs control for displaying the image data stored in the VRAM in the LCD or the LED. The display unit 108 may be referred to as an output unit.

The input unit 109 performs various inputs in response to operations by a user. The input unit 109 is used to operate the communication apparatus 101. The input unit 109 stores flags corresponding to the inputs in the storage unit 103. Audio input may be performed with the input unit 109. The input unit 109 may be referred to as an operation unit.

The shooting unit 110 is composed of, for example, an imaging device and a lens and captures a still image (shoots a picture) and shoots a video.

The configuration illustrated in FIG. 2 is only an example and the communication apparatus 101 may have another hardware configuration. For example, when the communication apparatus 101 is a printer, the communication apparatus 101 may include a printing unit, in addition to the components illustrated in FIG. 2. When the communication apparatus 101 is any of the APs 303 to 306, the communication apparatus 101 may not include the display unit 108 and the shooting unit 110.

<Functional Block Diagram of Communication Apparatus>

Figure 3:
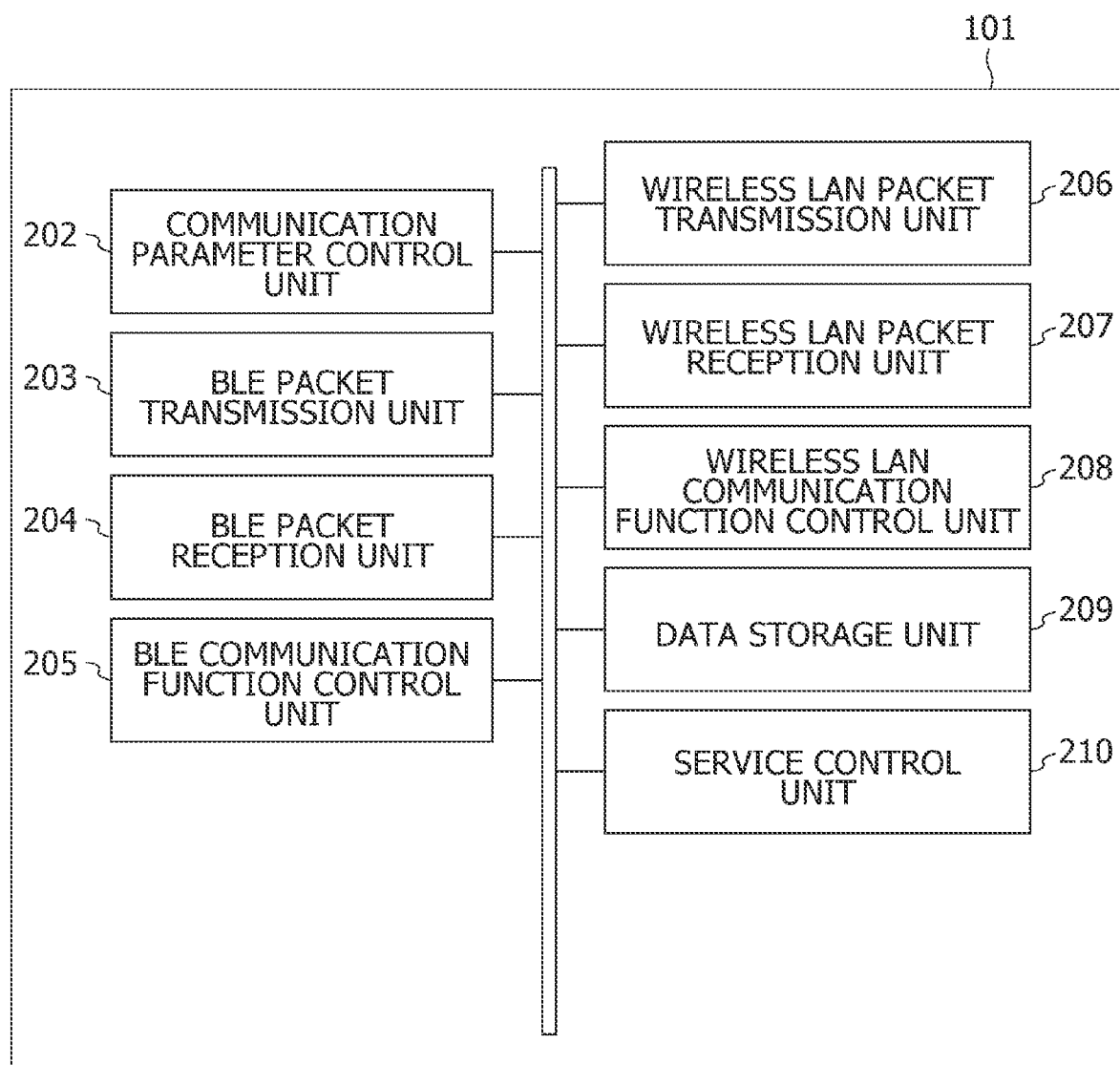
FIG. 3 is a block diagram illustrating an example of the software functional configuration of the communication apparatus in FIG. 2 according to an embodiment of the present disclosure.

FIG. 3 illustrates an example of the software functional configuration of the communication apparatus 101. In the present embodiment, the respective functional blocks (202 to 210) in the communication apparatus 101 are stored as the programs in the storage unit 103 and the functions corresponding to the respective functional blocks are performed by the control unit 102, which executes the programs. The control unit 102 controls the respective hardware components and calculates and processes the information in accordance with the control programs to realize the respective functions.

As illustrated in FIG. 3, the communication apparatus 101 includes a communication parameter control unit 202, a BLE packet transmission unit 203, a BLE packet reception unit 204, and a BLE communication function control unit 205. In addition, the communication apparatus 101 includes a wireless LAN packet transmission unit 206, a wireless LAN packet reception unit 207, a wireless LAN communication function control unit 208, a data storage unit 209, and a service control unit 210.

The communication parameter control unit 202 performs a communication parameter sharing process for sharing the communication parameters between the apparatuses. In the communication parameter sharing process, a providing apparatus provides the communication parameters for the wireless communication to a reception apparatus. The communication parameters include wireless communication parameters, such the SSID, which is a network identifier, an encryption method, an encryption key, an authentication method, and an authentication key, which are necessary to perform the wireless LAN communication. The communication parameters may include a connector defined in the DPP, a MAC address, a pre-shared key (PSK), a passphrase, an Internet Protocol (IP) address for communication on an IP layer, information necessary for an upper-level service, and so on. It is assumed that the communication parameter sharing process performed by the communication parameter control unit 202 conforms to the DPP.

The BLE packet transmission unit 203 controls the BLE communication unit 105 to transmit a packet conforming to the BLE standard and the BLE packet reception unit 204 controls the BLE communication unit 105 to receive a packet conforming to the BLE standard. In the DPP using the BLE, the enrollee transmits bootstrap information including a public key and the MAC address to the configurator using AUX_ADV_IND, which is one kind of an advertising packet. The public key is one kind of the encryption key used in a public key encryption method.

The BLE communication function control unit 205 controls the BLE packet transmission unit 203 and the BLE packet reception unit 204 to provide a communication function defined in the BLE standard.

The wireless LAN packet transmission unit 206 controls transmission of all packets including a communication protocol of an upper layer and the wireless LAN packet reception unit 207 controls reception of all packets including the communication protocol of the upper layer. In addition, the wireless LAN packet transmission unit 206 controls the wireless LAN communication unit 104 to transmit the packets conforming to the IEEE 802.11 standard to an opposing apparatus and the wireless LAN packet reception unit 207 controls the wireless LAN communication unit 104 to receive the packets conforming to the IEEE 802.11 standard from the opposing apparatus.

The wireless LAN communication function control unit 208 controls the wireless LAN packet transmission unit 206 and the wireless LAN packet reception unit 207 to provide the communication function defined in the IEEE 802.11 standard. For example, the wireless LAN communication function control unit 208 controls the wireless LAN packet reception unit 207 to perform a scanning process to detect surrounding APs. The scanning process that is performed may be active scan in which Probe Request is transmitted and Probe Response is received or may be passive scan in which a beacon signal transmitted from the AP is received. When the communication apparatus 101 operates as a station (hereinafter referred to as "STA"), the wireless LAN communication function control unit 208 performs, for example, an authentication and encryption process. When the communication apparatus 101 operates as an AP, the wireless LAN communication function control unit 208 forms a wireless network to perform the authentication and encryption process for the STA, manage the STA, and so on.

The data storage unit 209 controls writing and reading of information about software, the communication parameters, and types of barcodes into and from the storage unit 103.

When the communication apparatus 101 is any of the APs 303 to 306, the communication apparatus 101 may not include the BLE packet transmission unit 203, the BLE packet reception unit 204, and the BLE communication function control unit 205.

The service control unit 210 is a control unit on an application layer. The application layer means a service providing layer on a fifth or higher layer in an Open Systems Interconnection (OSI) reference model. In other words, the service control unit 210 performs, for example, an image streaming process and a file transfer process using the wireless LAN communication by the wireless LAN communication unit 104.

The multiple functional blocks illustrated in FIG. 3 may be integrated into one functional block or any of the functional blocks may be divided into multiple functional blocks. In addition, part or all of the functions included in the functional blocks illustrated in FIG. 3 may be realized by hardware. In this case, part or all of the respective functional blocks are composed of, for example, application specific integrated circuits (ASICs).

The operations of the communication system 10 including the communication apparatus 101 having the above configuration will now be described with reference to FIG. 4 to FIG. 6. It is assumed that the smartphone 30 holds in advance the communication parameters necessary to connect to the AP 303.

<Processing Flow in Enrollee>

Figure 4:
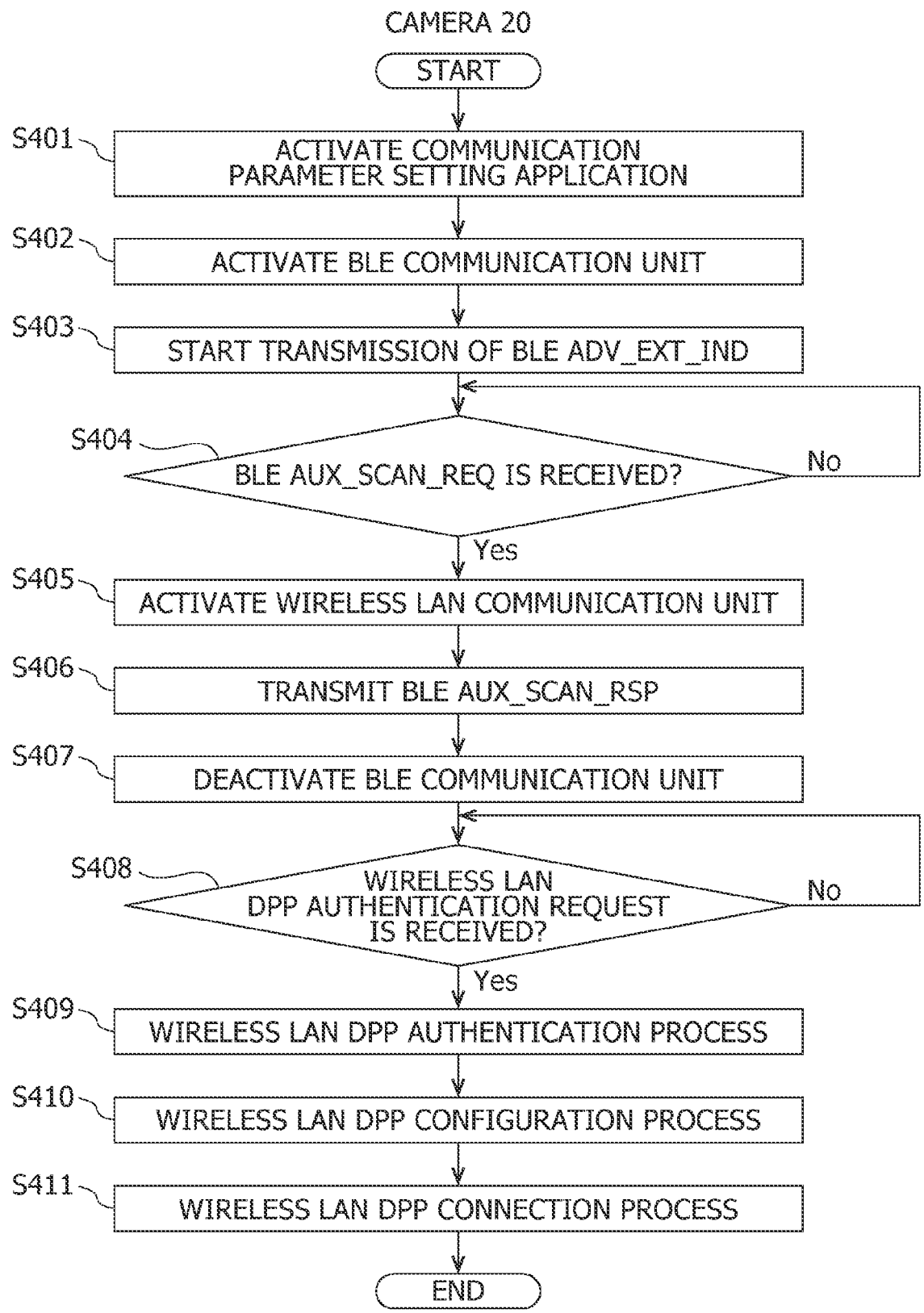
FIG. 4 is a flowchart illustrating the operation of a camera according to an embodiment of the present disclosure.

FIG. 4 is a flowchart illustrating an example of a process performed by the camera 20, which functions as the enrollee. In the following flowcharts, S represents Step.

Referring to FIG. 4, in S401, the user operates the input unit 109 in the camera 20 to activate a communication parameter setting application. Upon activation of the communication parameter setting application, in S402, the camera 20 activates the BLE communication unit 105.

In S403, the camera 20 controls the BLE communication unit 105 to start transmission of ADV_EXT_IND. In the DPP, transmission of the bootstrap information, such as the public key and the MAC address, which is necessary for a DPP Authentication process (authentication process) described below, in AUX_ADV_IND is defined. ADV_EXT_IND and AUX_ADV_IND are the advertising packets defined in the BLE. ADV_EXT_IND is the advertising packet for indicating the presence of AUX_ADV_IND. Originally, the enrollee defined in the DPP periodically transmits ADV_EXT_IND and AUX_ADV_IND (reference numerals 701 and 702, respectively, in FIG. 7) and performs the transmission with the bootstrap information being included in AUX_ADV_IND. The camera 20, which is the enrollee of the present embodiment, transmits only ADV_EXT_IND (reference numeral 601 in FIG. 6) and does not transmit AUX_ADV_IND in S403.

In S404, the camera 20 determines whether AUX_SCAN_ REQ is received from the smartphone 30. If the determination result in S404 is affirmative (YES), the process goes to S405. If the determination result in S404 is negative (NO), the process repeats S404.

AUX_SCAN_REQ is a packet to request AUX_SCAN_RSP of the transmission source of the advertising packet. The configurator defined in the DPP transmits AUX_SCAN_REQ when the configurator does not receive ADV_EXT_IND and the enrollee defined in the DPP transmits AUX_SCAN_RSP with the bootstrap information being included AUX_SCAN_RSP upon reception of AUX_SCAN_REQ.

Although S404 is repeated if the determination result in S404 is negative (NO) in FIG. 4, the camera 20 may perform a timeout process to terminate the application if the camera 20 does not receive AUX_SCAN_REQ from the smartphone 30 within a predetermined time. In other words, when a state in which the determination result in S404 is negative (NO) continues for a predetermined time, the process may go to END from S404.

In S405, the camera 20 activates the wireless LAN communication unit 104. In other words, AUX_SCAN_REQ is a signal to activate the communication unit having higher power consumption, among the two communication units 104 and 105 in the camera 20.

In S406, the camera 20 transmits AUX_SCAN_RSP to the smartphone 30. Here, the camera 20 transmits AUX_SCAN_RSP with a channel list supported by the wireless LAN communication unit 104 in the camera 20 being included in AUX_SCAN_RSP, in addition to the public key and the MAC address necessary for the DPP authentication process. The channel list may be replaced with information of an arbitrary format (a format other than the list) indicating the channels supported by the wireless LAN communication unit 104 in the camera 20.

Upon completion of transmission of AUX_SCAN_RSP, in S407, the camera 20 deactivates the BLE communication unit 105. In S408, the camera 20 determines whether DPP Authentication Request (authentication request) is received from the smartphone 30. If the determination result in S408 is affirmative (YES), the process goes to S409. If the determination result in S408 is negative (NO), the process repeats S408.

In S409, the camera 20 performs the authentication process based on identification information calculated from the public key of the camera 20 and identification information included in the received DPP authentication request. The camera 20 determines whether the identification information included in the received DPP authentication request coincides with the calculated identification information and transmits DPP Authentication Response (authentication response) indicating whether the authentication process succeeded. Then, upon reception of DPP Authentication Confirm indicating that the authentication succeeded from the smartphone 30, the authentication process is terminated and wireless LAN connection based on the DPP is established.

In S410, the camera 20 transmits DPP Configuration Request (configuration request) to request the communication parameters of the smartphone 30. Upon reception of DPP Configuration Response (configuration response) including the communication parameters from the smartphone 30 by the camera 20 in response to DPP Configuration Request, a DPP configuration process is terminated. In the DPP, authentication and key management (AKM), legacy PSK-passphrase, Connector (connector), Expiry (expiry date), and so on are defined as the communication parameters. The AKM is a value indicating which authentication protocol and which key exchange algorithm are used in the communication. The legacy PSK-passphrase is an encryption key when the authentication-key exchange based on Wi-Fi protected access (WPA) or IEEE 802.11 in related art is performed. The legacy PSK-passphrase is information for connection to the AP that does not support the DPP. The connector is a variety of information used in the authentication protocol and the key exchange algorithm defied in the DPP. The connector is information for connection to the AP that supports the DPP.

In S411, the camera 20 transmits a connection request signal to the AP based on the communication parameters included in the DPP configuration response. The connector is included in the connection request signal conforming to the DPP. At least management apparatus information indicating that the apparatus (the configurator) that has provided the communication parameters is the smartphone 30 is included in the connector. Upon reception of the connection request signal, the AP compares the management apparatus information in the signal with a management apparatus list stored in the AP to confirm whether the same apparatus (the smartphone 30) is registered. If the AP confirms that the same apparatus is registered, the AP transmits a connection permission signal for permitting the connection of the camera 20 to the camera 20. Upon reception of the connection permission signal from the AP, the camera 20 performs a necessary process, such as the key exchange process using 4-Way Handshake, with the AP to establish the wireless LAN connection between the camera 20 and the AP.

<Processing Flow in Configurator>

Figure 5:
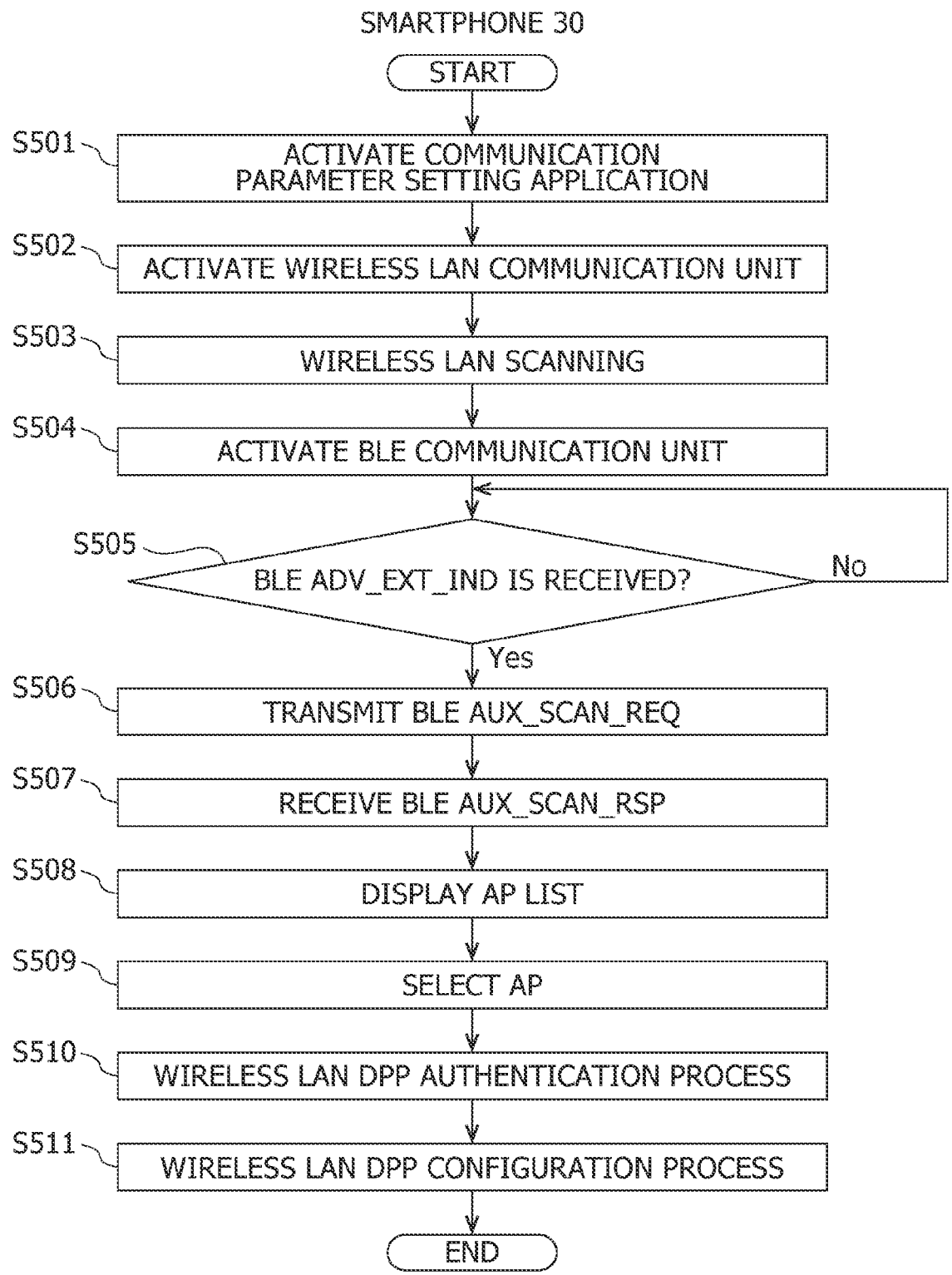
FIG. 5 is a flowchart illustrating the operation of a smartphone according to an embodiment of the present disclosure.

FIG. 5 is a flowchart illustrating an example of a process performed by the smartphone 30, which functions as the configurator.

Referring to FIG. 5, in S501, the user operates the input unit 109 in the smartphone 30 to activate the communication parameter setting application. Upon activation of the communication parameter setting application, in S502, the smartphone 30 activates the wireless LAN communication unit 104.

In S503, the smartphone 30 performs wireless LAN scanning of all the channels supported by the smartphone 30 to detect surrounding APs. For example, when the smartphone 30 supports both 2.4 GHz and 5 GHz, the smartphone 30 performs the wireless LAN scanning in both bands to detect surrounding APs that forms a wireless network in the 2.4-GHz channel or the 5-GHz channel.

Upon completion of the wireless LAN scanning, in S504, the smartphone 30 activates the BLE communication unit 105.

In S505, the smartphone 30 determines whether ADV_EXT_IND transmitted from the camera 20 is received. If the determination result in S505 is affirmative (YES), the process goes to S506. If the determination result in S505 is negative (NO), the process repeats S505.

In S506, the smartphone 30 transmits AUX_SCAN_REQ to the camera 20. As the result of the operation of the smartphone 30 in S506, S405 and S406 are performed in the camera 20 and AUX_SCAN_RSP is transmitted from the camera 20 to the smartphone 30.

In S507, the smartphone 30 receives AUX_SCAN_RSP from the camera 20. Then, the smartphone 30 knows the channel supported by the camera 20 from the channel list included in AUX_SCAN_RSP.

In S508, the smartphone 30 displays an AP list based on the result of the scanning in S503 in the display unit 108.

In the display of the AP list in the display unit 108, the smartphone 30 may display only the APs operating in the channel to which the camera 20 is capable of being connected, in the channel list of the camera 20, which is acquired in S507. In other words, the smartphone 30 may not display all the APs that are detected and may display part of the APs. For example, when the camera 20 supports only 2.4 GHz, the smartphone 30 may not display the APs operating at 5 GHz and may display only the APs that are detected at 2.4 GHz. In such display, even when the wireless LAN channel supported by the configurator is different from that of the enrollee (the configurator supports 2.4 GHz and 5 GHz while the enrollee supports only 2.4 GHz), the smartphone 30 does not display the APs operating at 5 GHz at which the wireless LAN connection with the enrollee is disabled in the AP list. Accordingly, the user does not erroneously select the APs operating at 5 GHz (the APs for which the wireless LAN connection with the enrollee is disabled).

In addition, the smartphone 30 may display all the APs that are detected in the display unit 108 and may display only the APs operating in the channel to which the camera 20 is capable of being connected, among the displayed APs, as selectable APs. In this case, whether the APs are selectable may be indicated using a mark, a color, or the like. In other words, the display unit 108 may display all the APs detected through the scanning process in the wireless LAN communication unit 104 and may display in a differentiating way the access points described in the channel list (S507) and the other access points.

The smartphone 30 may select only the APs that are capable of providing the communication parameters to the camera 20 using the DPP to display the selected APs.

The smartphone 30 may display only the APs which are capable of providing the communication parameters to the camera 20 using the DPP and registration of which in the management apparatus list is known.

If only one AP is capable of being displayed, S508 may be skipped in the smartphone 30.

In S509, the user operates the input unit 109 in the smartphone 30 to select the AP, which is the destination of the wireless LAN connection of the camera 20. The smartphone 30 starts the DPP authentication process in S510.

In S510, the smartphone 30 calculates the hash value for the public key included in the acquired bootstrap information to generate the identification information and transmits the DPP authentication request including the identification information. Then, the camera 20 receives the DPP authentication request (S408) and transmits the DPP authentication response to the smartphone 30 (S409). Then, the smartphone 30 performs the authentication process and a process of creating a common key based on the information included in the DPP authentication response. Upon success of the authentication process, the smartphone 30 transmits DPP Authentication Confirm indicating the success of the authentication to the camera 20. Then, the DPP authentication process is terminated.

In S511, the smartphone 30 transmits DPP Configuration Confirm including the communication parameters of the AP selected in S509 to the camera 20.

<Operation Sequence of Enrollee and Configurator>

Figure 6:
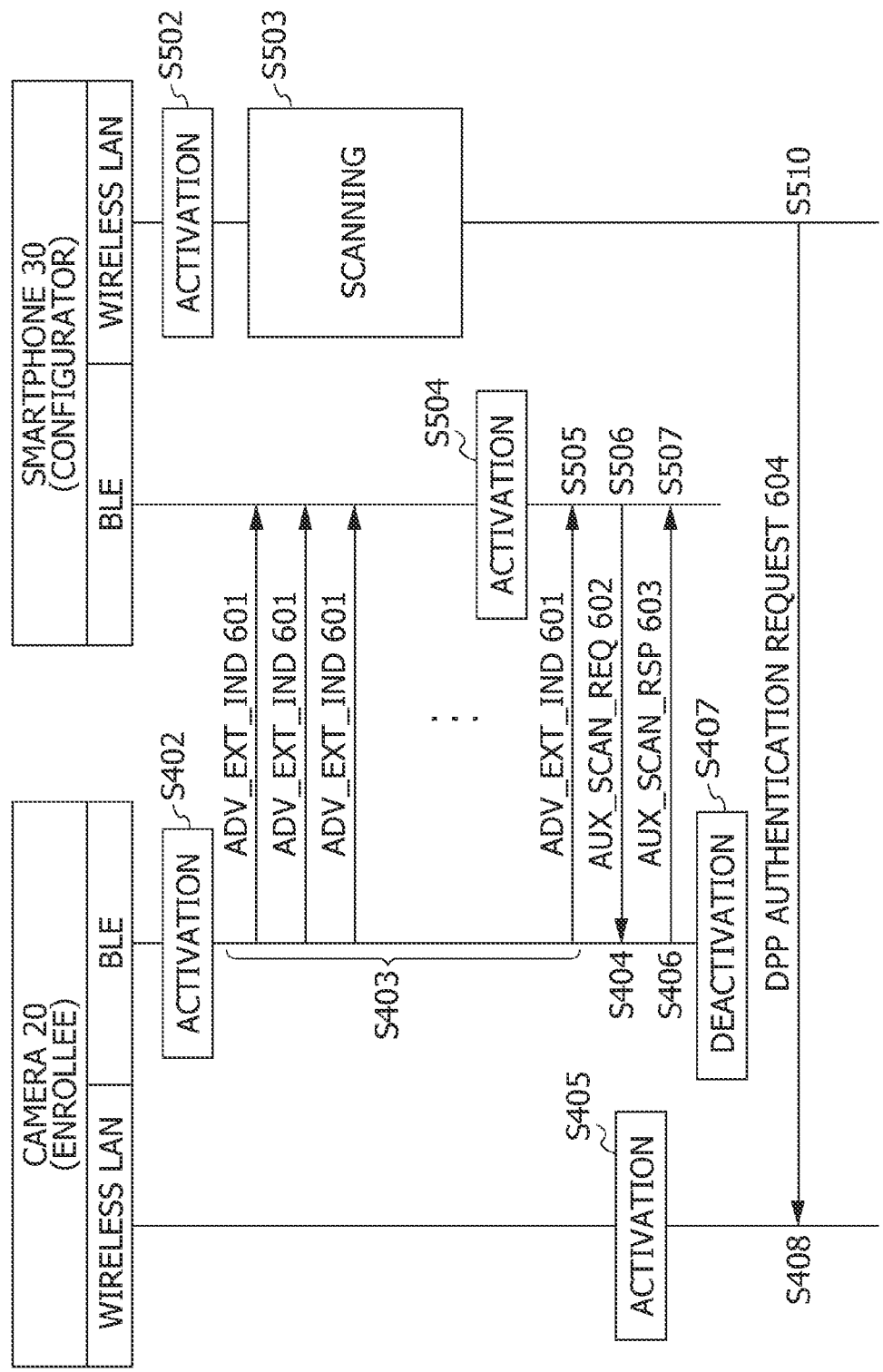
FIG. 6 is a sequence diagram for description of the operation of the communication system in FIG. 1 according to an embodiment of the present disclosure.

FIG. 6 is a sequence diagram indicating an example of the operations of the camera 20 and the smartphone 30.

The camera 20 activates the BLE communication unit 105 (S402) after the communication parameter setting application is activated and starts transmission of the ADV_EXT_IND 601 (S403). The smartphone 30 activates the wireless LAN communication unit 104 (S502) after the communication parameter setting application is activated and performs the scanning process (S503). Then, the smartphone 30 activates the BLE communication unit 105 (S504). Upon reception of the ADV_EXT_IND 601 from the camera 20 (S505), the smartphone 30 transmits AUX_SCAN_REQ 602 to the camera 20 (S506). Upon reception of the AUX_SCAN_REQ 602 (S404), the camera 20 activates the wireless LAN communication unit 104 (S405). In other words, the camera 20 uses the AUX_SCAN_REQ 602 transmitted from the smartphone 30 as an activation trigger of the wireless LAN communication unit 104.

The advantage (reduction in the power consumption) of the use of the AUX_SCAN_REQ 602 as the activation trigger of the wireless LAN communication unit 104 will now be described with reference to FIG. 7.

Figure 7:
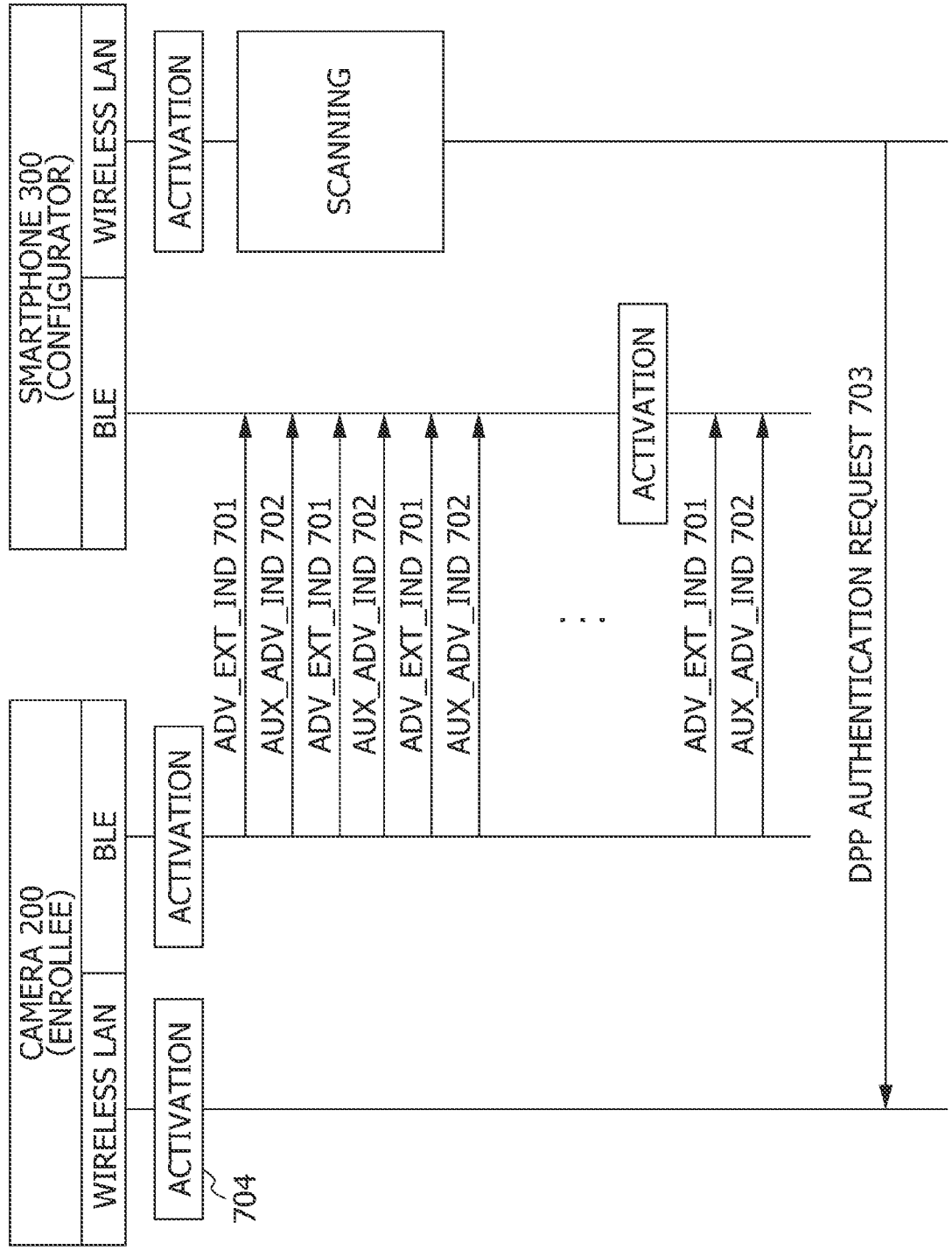
FIG. 7 is a sequence diagram for description of a standard DPP operation according to an embodiment of the present disclosure.

FIG. 7 illustrates a standard operation sequence defined in the DPP. The operation sequence illustrated in FIG. 7 is different from the operation sequence of the present embodiment illustrated in FIG. 6. Referring to FIG. 7, upon activation of the communication parameter setting application, a camera 200 starts transmission of the ADV_EXT_IND 701 and the AUX_ADV_IND 702. Upon reception of the AUX_ADV_IND 702, a smartphone 300 transmits a DPP authentication request 703 to the camera 200 based on the bootstrap information. In the DPP, a sequence to perform reception confirmation of the AUX_ADV_IND 702 is not defined between the camera 200 and the smartphone 300 and the camera 200 does not know the timing when the smartphone 300 transmits the DPP authentication request 703. Accordingly, in order to receive the DPP authentication request 703, for example, it is necessary for the camera 200 to activate the wireless LAN communication unit 104 (704) before transmitting the ADV_EXT_IND 701 to be in a reception idle state. In the reception idle state, high power consumption is caused in the camera 200.

Referring back to FIG. 6, the camera 20 of the present embodiment uses the AUX_SCAN_REQ 602 transmitted from the smartphone 30 as the activation trigger of the wireless LAN communication unit 104, as described above. Accordingly, it is possible to reduce the time period in which the wireless LAN communication unit 104 in the camera 20 is in the reception idle state to reduce the power consumption.

After the wireless LAN communication unit 104 in the camera 20 is activated (S405), the camera 20 transmits AUX_SCAN_RSP 603 to the smartphone 30 (S406) and deactivates the BLE communication unit 105 (S407). The smartphone 30 receives the AUX_SCAN_RSP 603 from the camera 20 (S507).

Then, the smartphone 30 transmits a DPP authentication request 604 to the camera 20 (S510). The camera 20 receives the DPP authentication request 604 (S408).

<Advantages of Embodiment>

As described above, according to the present embodiment, the camera 20 (the enrollee) does not perform the scanning process to detect the APs within a predetermined range. Accordingly, it is possible to reduce the power consumption in the camera 20.

In addition, since the camera 20 does not activate the wireless LAN communication unit 104 until the camera 20 receives the AUX_SCAN_REQ 602 transmitted from the smartphone 30 in the present embodiment, the reception idle time of the wireless LAN communication unit 104 in the camera 20 is capable of being reduced. Accordingly, it is possible to reduce the power consumption in the camera 20.

Furthermore, since the AP list to which the camera 20 is capable of being connected is capable of being displayed in the smartphone 30 (the configurator), it is possible to improve the user-friendliness.

Although the operation is described in the present embodiment in which the camera 20 does not transmit AUX_ADV_IND, the embodiments of the present disclosure are not limited to this configuration. It is sufficient for the camera 20 to receive AUX_SCAN_REQ as the activation trigger of the wireless LAN communication unit 104. If the camera 20 transmits AUX_ADV_IND, the smartphone 30 is capable of transmitting AUX_SCAN_REQ after the scanning is performed, as in the present embodiment. In this case, the smartphone 30 may receive AUX_ADV_IND from the camera 20 before the scanning is performed and may perform the scanning process only for the APs supported by the camera 20 based on the channel list included in AUX_ADV_IND. In other words, the channel for which the scanning process is performed may be determined based on the channel list (the information about the channels).

Although the case is described in the present embodiment in which the communication between the camera 20 and the smartphone 30 is performed through the wireless LAN communication conforming to IEEE 802.11 and the BLE, the embodiments of the present disclosure are not limited to this configuration. For example, the wireless communication, such as a public wireless communication, such as Long Term Evolution (LTE) or 5th generation (5G), wireless ultra wide band (UWB), Bluetooth (registered trademark), ZigBee (registered trademark), or near field communication (NFC), may be used. The channels 2.4 GHz and 5 GHz used in the wireless LAN in the above description are only examples and other channels including 6 GHz may be used. The wireless UWB includes wireless universal serial bus (USB), wireless 1394, Wireless networking (WINET), and so on.

If the determination result in S408 FIG. 4 is negative (NO) or if the determination result in S505 in FIG. 5 is negative (NO), the timeout process to terminate the application may be performed.

OTHER EMBODIMENTS

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A wireless communication apparatus comprising:
   one or more processors; and
   one or more memories storing instructions that, when executed by the one or more processors, cause the wireless communication apparatus to:
   acquire, through wireless communication, information regarding an access point to which another wireless communication apparatus is able to connect, the access point being different from the wireless communication apparatus;
   acquire an encryption key used for an authentication process, which complies with a DPP (Device Provisioning Protocol) standard, from said another wireless communication apparatus;
   select a communication parameter to be provided to said another wireless communication apparatus, wherein the selected communication parameter includes information which is used to connect to the access point different from the wireless communication apparatus;
   display information regarding the access point corresponding to the selected communication parameter;
   in a case where a user performs a predetermined operation, transmit, to said another wireless communication apparatus, an authentication request, which complies with the DPP standard, including a hash value of the acquired encryption key;
   receive, from said another wireless communication apparatus, an authentication response, which complies with the DPP standard, for the authentication request; and
   provide the selected communication parameter to said another wireless communication apparatus after receiving the authentication response wherein the said another wireless communication apparatus uses the provided communication parameter to connect to the access point.

2. The wireless communication apparatus according to claim 1, wherein the wireless communication apparatus acquires, through wireless communication, the information and the encryption key from said another wireless communication apparatus.

3. The wireless communication apparatus according to claim 1, wherein the wireless communication apparatus acquires the information regarding the access point by active scanning in which Probe Request is transmitted and Probe Response is received, or by passive scanning in which a beacon signal is received.

4. The wireless communication apparatus according to claim 1, wherein the access point is an access point to which the wireless communication apparatus has connected.

5. The wireless communication apparatus according to claim 1, wherein the communication parameter includes Service Set Identifier (SSID).

6. The wireless communication apparatus according to claim 1, wherein the instructions further cause the wireless communication apparatus to acquire information regarding a plurality of access points to which another wireless communication apparatus is able to connect, each of the plurality of access points being different from the wireless communication apparatus.

7. A wireless communication apparatus comprising:
   one or more processors; and
   one or more memories storing instructions that, when executed by the one or more processors, cause the wireless communication apparatus to:
   transmit, through wireless communication, an encryption key used for an authentication process, which complies with a DPP standard, in a providing process;
   in a case where a user performs a predetermined operation to another communication apparatus, receive, from another the other wireless communication apparatus, an authentication request, which complies with the DPP standard, including a hash value of the encryption key;
   transmit, to said another wireless communication apparatus, an authentication response, which complies with the access point being different from the wireless communication apparatus, for the authentication request;
   receive a communication parameter transmitted by said another wireless communication apparatus after transmitting the authentication response wherein the transmitted communication parameter is a communication parameter which is selected in said another wireless communication apparatus; and
   use the transmitted communication parameter to connect to the access point which is different from the other communication apparatus.

8. The wireless communication apparatus according to claim 7, wherein the wireless communication apparatus operates as an enrollee defined in Device Provisioning Protocol.

9. The wireless communication apparatus according to claim 7, wherein the wireless communication apparatus transmits information regarding the access point and the encryption key to said another wireless communication apparatus.

10. The wireless communication apparatus according to claim 7, wherein the communication parameter includes Service Set Identifier (SSID).

11. A wireless communication system comprising a first wireless communication apparatus and a second wireless communication apparatus,
   the first wireless communication apparatus comprising:
   one or more processors; and
   one or more memories storing instructions that, when executed by the one or more processors, cause the first wireless communication apparatus to:
   acquire, through wireless communication, information regarding an access point to which the second wireless communication apparatus is able to connect, the access point being different from the wireless communication apparatus;
   acquire an encryption key used for an authentication process in a providing process from the second wireless communication apparatus;
   select a communication parameter to be provided to the second wireless communication apparatus wherein the selected communication parameter includes information which is used to connect to the access point;
   display information regarding the access point, which complies with a DPP (Device Provisioning Protocol) standard, corresponding to the selected communication parameter;
   in a case where a user performs a predetermined operation,
   transmit, to said another wireless communication apparatus, an authentication request, which complies with a DPP (Device Provisioning Protocol) standard, including a hash value of the encryption key receive, from said another wireless communication apparatus, an authentication response, which complies with a DPP (Device Provisioning Protocol) standard, for the authentication request; and
provide the selected communication parameter to the second wireless communication apparatus after receiving the authentication response, and the second wireless communication apparatus comprising:
one or more processors; and
one or more memories storing instructions that, when executed by the one or more processors, cause the second wireless communication apparatus to:
transmit, through wireless communication, the encryption key to the first wireless communication apparatus;
receive, from the first wireless communication apparatus, the authentication request;
transmit, to the first wireless communication apparatus, the authentication response;
receive the communication parameter transmitted by said the first wireless communication apparatus after transmitting the authentication response; and
use the transmitted communication parameter to connect to the access point.

12. A method of controlling a wireless communication apparatus comprising:
acquiring, through wireless communication, information regarding an access point to which another wireless communication apparatus is able to connect, the access point being different from the wireless communication apparatus;
acquiring an encryption key used for an authentication process, which complies with a DPP (Device Provisioning Protocol) standard, from said another wireless communication apparatus;
selecting a communication parameter to be provided to said another wireless communication apparatus, wherein the selected communication parameter includes information which is used to connect to the access point different from the wireless communication apparatus;
displaying information regarding the access point corresponding to the selected communication parameter;
in a case where a user performs a predetermined operation, transmitting, to said another wireless communication apparatus, an authentication request, which complies with the DPP standard, including a hash value of the acquired encryption key;
receiving, from said another wireless communication apparatus, an authentication response, which complies with the DPP standard, for the authentication request; and
providing the selected communication parameter to said another wireless communication apparatus after receiving the authentication response wherein the said another wireless communication apparatus uses the provided communication parameter to connect to the access point.

13. A non-transitory computer-readable storage medium storing instructions for causing a wireless communication apparatus to execute a process of:
acquiring, through wireless communication, information regarding an access point to which another wireless communication apparatus is able to connect, the access point being different from the wireless communication apparatus;
acquiring an encryption key used for an authentication process, which complies with a DPP (Device Provisioning Protocol) standard, from said another wireless communication apparatus;
selecting a communication parameter to be provided to said another wireless communication apparatus, wherein the selected communication parameter includes information which is used to connect to the access point different from the wireless communication apparatus;
displaying information regarding the access point corresponding to the selected communication parameter;
in a case where a user performs a predetermined operation, transmitting, to said another wireless communication apparatus, an authentication request, which complies with the DPP standard, including a hash value of the acquired encryption key;
receiving, from said another wireless communication apparatus, an authentication response, which complies with the DPP standard, for the authentication request; and
providing the selected communication parameter to said another wireless communication apparatus after receiving the authentication response wherein the said another wireless communication apparatus uses the provided communication parameter to connect to the access point.

* * * * *